(12) United States Patent
Pye et al.

(10) Patent No.: US 6,408,521 B1
(45) Date of Patent: Jun. 25, 2002

(54) HYGIENIC KITCHEN SPOON

(76) Inventors: Nina Boyles Pye, 4660 Pontchar Train Dr., Slidell, LA (US) 70458; T. Wilfred Pye, 304 Fairmount Dr., Hooma, LA (US) 70360

( * ) Notice: Subject to any disclaimer, the term of this patent is extended or adjusted under 35 U.S.C. 154(b) by 0 days.

(21) Appl. No.: 09/632,978

(22) Filed: Aug. 4, 2000

(51) Int. Cl.[7] ................................................. A47J 43/28
(52) U.S. Cl. ........................................... 30/141; 30/324
(58) Field of Search ........................... 30/141, 324–325; D7/653

(56) References Cited

U.S. PATENT DOCUMENTS

D212,548 S  * 10/1968  Ganssle ........................ 30/142

FOREIGN PATENT DOCUMENTS

| DE | 239692 | * | 3/1911 | ................ 30/141 |
| DE | 280925 | * | 12/1913 | ................ 30/141 |

* cited by examiner

Primary Examiner—Douglas D. Watts

(57) ABSTRACT

This application relates to a cooking spoon or ladle providing improvements designed to prevent the transference of saliva and oral bacteria from a cook to liquid based foods during preparation. This is achieved by the provision of a handle excavated sufficient to allow a sample of the cuisine to flow along the handle from the initial concavity of the stirring end, to a second smaller spoon at the other end of the handle. In the process of departing from the heat source by flowing from the stirring end to the tasting end, the cuisine begins cooling relative to its initial temperature. A simple finger-activated gate can be closed to allow the upper neck to be isolated from the tasting spoon contents.

17 Claims, 3 Drawing Sheets

HYGIENIC KITCHEN SPOON

Figure 1:
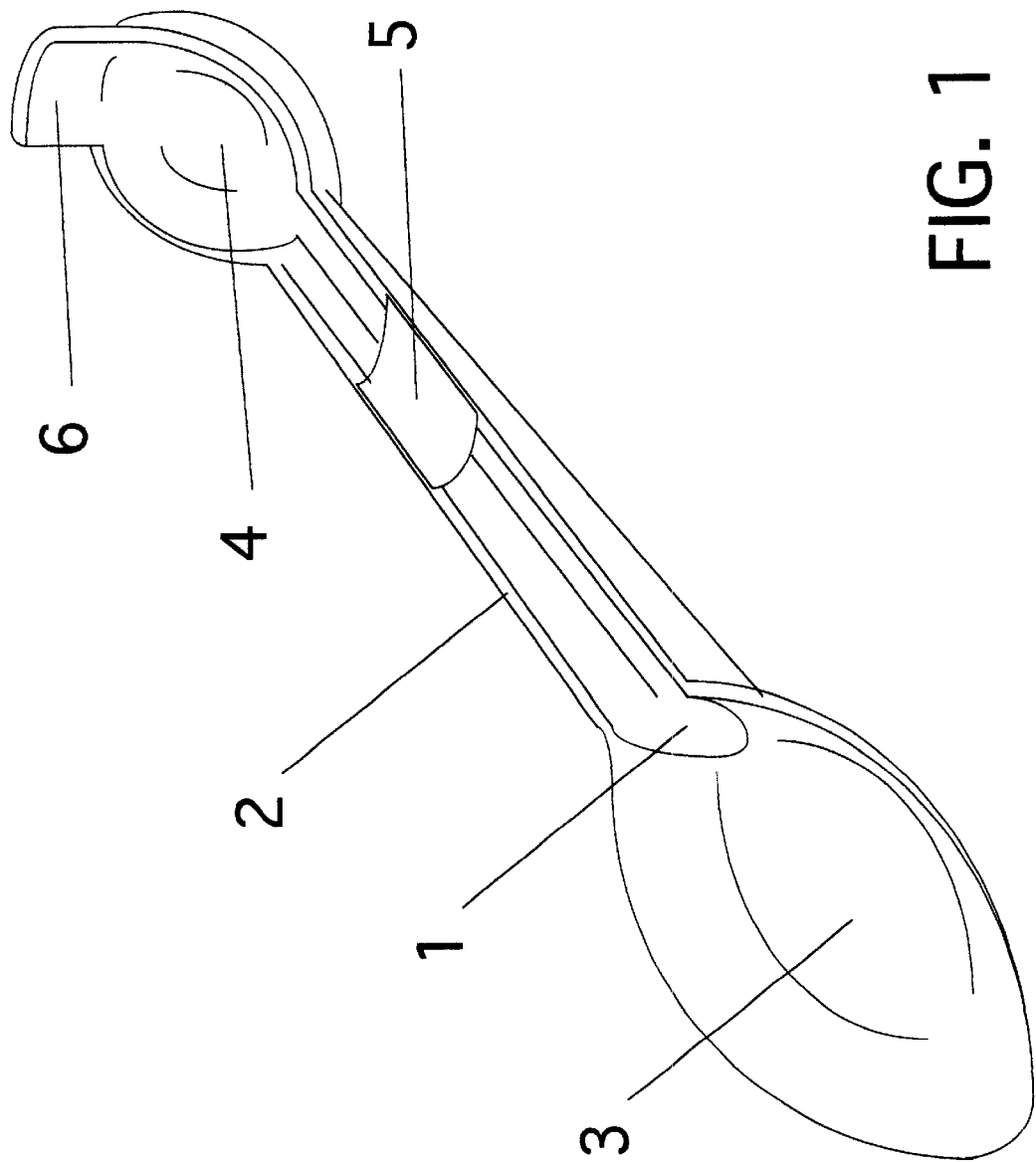

This application relates to the field of food preparation, and more specifically involves spoon type implements used to stir by hand a variety of liquid based foods.

DISCUSSION OF THE PRIOR ART

The art of food preparation has involved the use of the typical spoon or ladle for countless centuries. Ingenious modifications to the ancient plan of a handle with a scoop fashioned on one end have invariably involved either concavity shapes or thermal resistant materials. Recent U.S. Pat. No. 05,960,891 involves a utensil with the usual spoon on one end of a standard handle and a cutting implement on the handle's other end. Relative to the tasting operation, whereby a chef lifts a portion of the food to the mouth and samples the cuisine under preparation, hygienic measures have not been addressed to the spoon itself. In this modern age, the accepted method is to have small disposable spoons handy for this purpose, which are either discarded after use, or collected in a bin for cleansing and subsequent reuse.

OBJECTS AND ADVANTAGES

It is therefore accordingly an object of the present invention to provide a hygienic kitchen spoon with a means to allow the chef to sample stirring-assisted foods at various stages of preparation without undue introduction of a portion of the the chef's current colony of oral bacteria in the process.

It is further accordingly an object of the present invention to provide a hygienic kitchen spoon with a means to somewhat cool the food portion used in the sampling process as a benefit to the chef's culinary endurance.

It is further accordingly an object of the present invention to provide a hygienic kitchen spoon with the tasting end modified with an upward projecting retaining barrier for occasions where the chef allows the cuisine to flow too rapidly down the handle into the smaller end, and to force the chef to sip from a side of the tasting spoon rather than insert the entire tip end into the mouth.

BACKGROUND OF THE INVENTION

The introduction of active contaminants from an ill chef to the food has always been a concern in food preparation, whether commercial or domestic in nature. This has long been complicated by the need of the food preparer to constantly sample the progress of the cuisine to get it right. With expediency being sacrificed to human nature the chefs are often guilty of placing their own interest to get the job done above that of maintaining good hygienic procedures.

The invention involves the placement of a smaller second spoon on the second end of a handle specifically modified to allow cuisine to flow by gravity under operator control from the stirring end to the second end. A finger-activated gate normally open can be closed and isolate the captured portion further. To do this a single pivoted lever pushed upward could drop the other end acting as the gate. This would allow a momentary means to keep excess cuisine from flowing back down the handle before it can be dumped into a nearby cup or some such receptacle dedicated to this purpose.

A non heat-conducting insulative material can be used for the entire spoon, or as is sometimes done for the neck portion only as a means to keep the chef's fingers from being scalded by heat transference from the pot. However, proper selection of material also allows the cuisine flowing along the neck to lose heat to the benefit of the chef's mouth.

Because thumbs tend to grasp handles on the top, a small plate can be snapfitted over the region in question to insure comfort and to prevent the thumb from coming in contact with food moving along the channeled portion.

DETAILED DESCRIPTION OF DRAWINGS

FIG. 1 is a drawing detailing an embodiment of the invention using a channel 1 running along handle 2 to connect the large stirring concavity 3 to the smaller tasting concavity 4. Isolation plate 5 is a snap fitted thumb rest designed to accommodate the hand without exposing the conveyed food to possible contact with the digits. The far lip of tasting concavity 4 is extended 6 beyond normal tapering to provide a retaining barrier if the chef allows the cuisine to flow too rapidly down the handle into the smaller end. Thus the extension 6 is crafted beyond the two dimensional ovoid that normally defines the upper lip of a spoon, which forces a taster to neatly sip from the sides of concavity 4 but not the tip end of the spoon itself.

Figure 2:
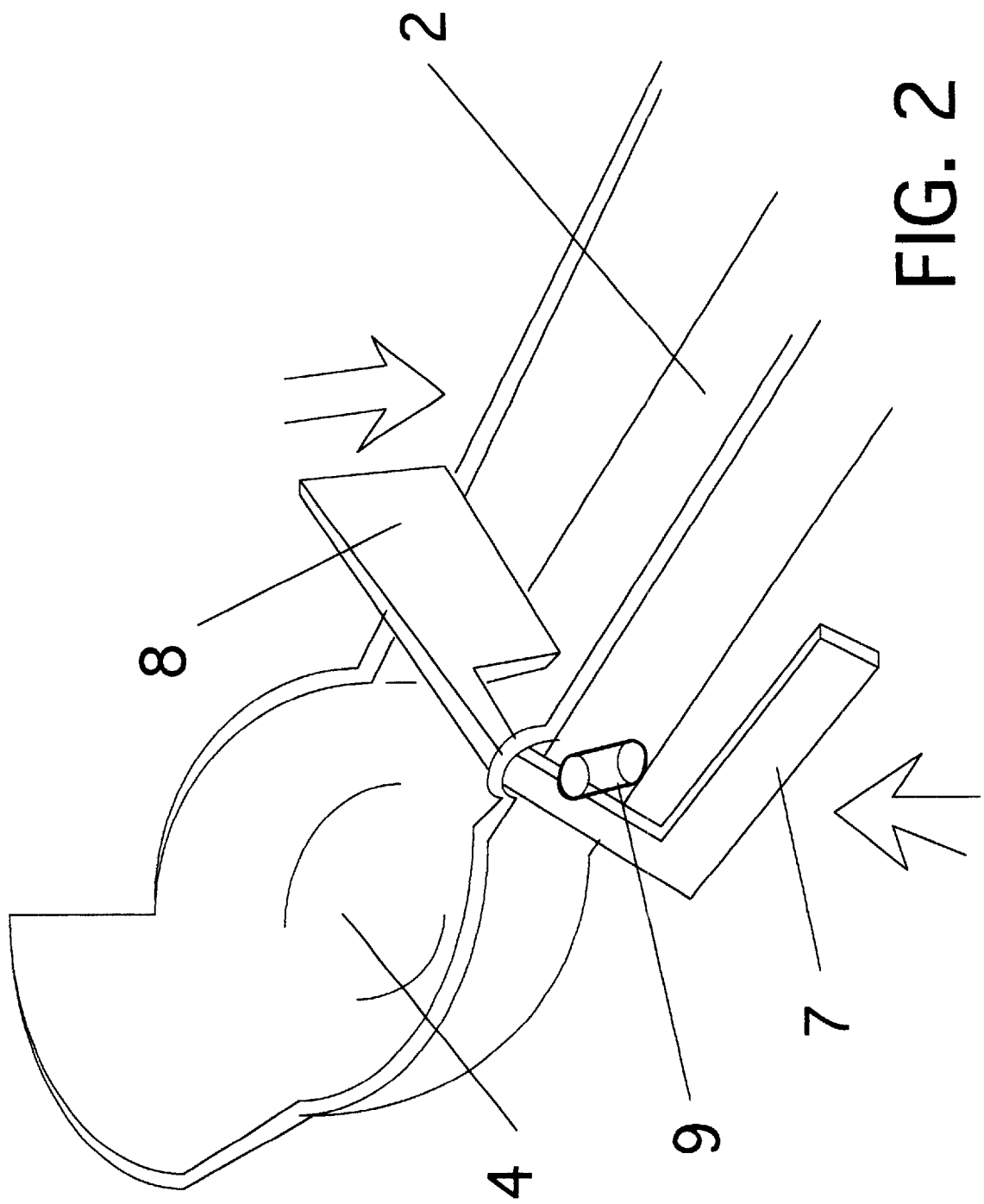

FIG. 2 shows a simple seesaw lever 7 in the open position still allowing conveyance of food from the neck 2 to the tasting spoon 4 underneath gate 8. An upward thrust (not shown) on lever 7 would drop gate 8 and seal off the conveyance of any further liquid, and trap momentarily any food in the spoon 4 itself. Release of finger pressure returns the gate to open position by a small rubber band 9.

Figure 3:
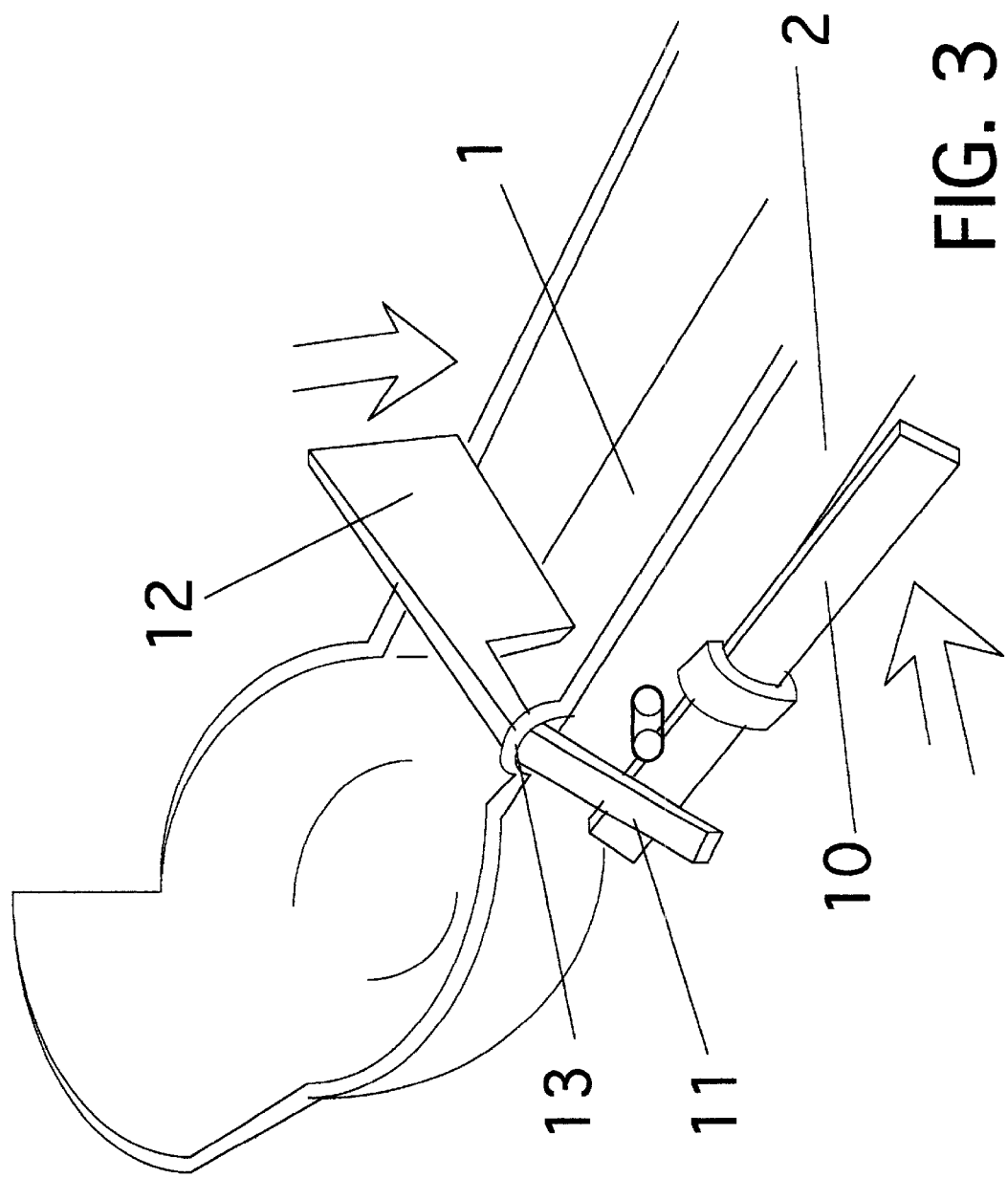

FIG. 3 shows a double levered apparatus with the finger activated lever 10 pulled in by a clasping force towards the neck 2 which extends the lever's far end extending second lever 11. This pulls down gate 12 over a second pivot 13 to create a temporary barrier to food returning down channel 1. This particular double action seesaw allows for a more comfortable action of the finger to close the gate than an upwards thrust.

SUMMARY

The need for an effective hygienic kitchen utensil such as the instant invention has long been needed in ordinary home as well as commercial food preparation outlets where the public is served. The built-in encouragement to follow good social behavior is elemental to a cook when given a choice to sample a cooler portion than a similar portion carried straight to the lips with the usually scalding hot stirring end. So both the clientel and the chef have positive reasons to desire the adoption of a superior design than that supplied by the current implement.

This invention should not be confined to the embodiments described as many modifications are possible to one skilled in the art, especially with methods to close the gate. This paper is intended to cover any variations, uses, or adaptations of the invention following the general principles as described and including such departures that come within common practice for this art and fall within the bounds of the claims appended herein.

We claim:

1. A hygienic spoon for facilitating the prevention of human oral fluids from reaching the source cuisine when the procedure of tasting occurs, comprising two spoon shaped ladle ends connected by a handle, said handle housing a channel for the entire length of said handle, with said channel emptying on both ends into said two ladle ends such that a fluid contained in either of said ladle ends may be allowed to run along said handle by the force of gravity under the control of an operator such that a portion of said fluid can be conveyed into the second of said ladle ends when initially introduced into the first of said ladle ends;

with the extreme outer lip of one of said two ladle ends extended further up into space through the two dimensional ovoid that normally defines the upper containment lip of a spoon shaped ladle end.

2. A hygienic spoon as in 1, together with a thin plate crafted to cover a portion of said channel of said handle such that said fluid can pass beneath said thin plate while being conveyed by gravity along the length of said handle, said thin plate either crafted in situ or attached by removable means to facilitate later cleaning of said channel.

3. A hygienic spoon as in 1, together with a normally open barrier gate crafted to be closed by finger pressure, said finger pressure instigating mechanical action to activate said closure of said gate.

4. A hygienic spoon as in 3, with said mechanical action of a type such as obtained by a bar-shaped lever when pivoted over a fixed edge to induce motion, said motion sufficient to move and thus close said barrier gate.

5. A hygienic spoon as in 4, together with a second lever activated by said motion of said bar-shaped lever, with one end of said second lever acting as said barrier gate.

6. A hygienic spoon as in 1, where one of said two spoon shaped ladle ends is of a size such that it can contain at minimum approximately twice as much fluid based contents as the second of said ladle ends can contain.

7. A hygienic spoon for facilitating the prevention of human oral fluids from reaching the source cuisine when the procedure of tasting occurs, comprising two spoon shaped ladle ends connected by a handle, said handle housing a channel for the entire length of said handle, with said channel emptying on both ends into said two ladle ends such that a fluid contained in either of said ladle ends may be allowed to run along said handle by the force of gravity under the control of an operator such that a portion of said fluid can be conveyed into the second of said ladle ends when initially introduced into the first of said ladle ends;

together with a normally open barrier gate crafted to be closed by finger pressure, said finger pressure instigating mechanical action to activate said closure of said gate.

8. A hygienic spoon as in 7, with said mechanical action of a type such as obtained by a bar-shaped lever when pivoted over a fixed edge to induce motion, said motion sufficient to move and thus close said barrier gate.

9. A hygienic spoon as in 8, together with a second lever activated by said motion of said bar-shaped lever, with one end of said second lever acting as said barrier gate.

10. A hygienic spoon as in 7, together with the extreme outer lip of one of said two ladle ends extended further up into space through the two dimensional ovoid that normally defines the upper containment lip of a spoon shaped ladle end.

11. A hygienic spoon as in 7, where one of said two spoon shaped ladle ends is of a size such that it can contain at minimum approximately twice as much fluid based contents as the second of said ladle ends can contain.

12. A method of reducing the introduction of human oral bacteria into liquid based food under preparation, said method comprising the steps of:

stirring said food with one end of a hygienic spoon, said spoon comprising two spoon shaped ladle ends connected by a handle,the extreme outer lip of one of said ladle ends extended further up into space through the two dimensional ovoid that normally defines the upper containment lip of a spoon shaped ladle end said handle housing a channel for the entire length of said handle, with said channel emptying on both ends into said two ladle ends such that a fluid contained in either of said ladle ends may be allowed to run along said handle by the force of gravity under the control of an operator such that a portion of said fluid can be conveyed into the second of said ladle ends when initially introduced into the first of said ladle ends;

conveying a portion of said food from said first of said ladle ends to said second of said ladle ends for a sample tasting by said operator;

returning said first of said ladle ends to said food under preparation for further stirring.

13. A method as in 12, wherein the second step of conveying a portion of said food for tasting is immediately followed by a step of closing by finger pressure a barrier gate across the region connecting said handle to said second of said ladle ends before said sample is actually tasted, said barrier gate crafted to be closed by said finger pressure, said finger pressure instigating mechanical action to activate said closure of said gate.

14. A method as in 13, with said mechanical action of a type such as obtained by a bar-shaped lever when pivoted over a fixed edge to induce motion, said motion sufficient to move and thus close said barrier gate.

15. A method as in 14, where said bar-shaped lever is together with a second lever activated by said motion of said bar-shaped lever, with one end of said second lever acting as said barrier gate.

16. A method as in 12, where said first of said ladle ends is of a size such that it can contain at minimum approximately twice as much fluid based contents as said second of said ladle ends can contain.

17. A method as in 12, where said handle is merged together with a thin plate crafted to cover a portion of said channel of said handle such that said fluid can pass beneath said thin plate while being conveyed by gravity along the length of said handle, said thin plate either crafted in situ or attached by removable means to facilitate later cleaning of said channel.

* * * * *